United States Patent
Kotlicki et al.

(10) Patent No.: US 10,564,991 B2
(45) Date of Patent: Feb. 18, 2020

(54) CONTENT ADAPTED MULTIMEDIA GUIDANCE

(71) Applicant: Toonimo Inc., New York, NY (US)

(72) Inventors: Dan Kotlicki, Tel-Aviv (IL); Ohad Rozen, Tel-Aviv (IL); Edi Buslovich, Natania (IL)

(73) Assignee: Toonimo Inc., New York, NY (US)

(*) Notice: Subject to any disclaimer, the term of this patent is extended or adjusted under 35 U.S.C. 154(b) by 121 days.

(21) Appl. No.: 15/569,410

(22) PCT Filed: Apr. 27, 2016

(86) PCT No.: PCT/IB2016/052378
§ 371 (c)(1),
(2) Date: Oct. 26, 2017

(87) PCT Pub. No.: WO2016/174585
PCT Pub. Date: Nov. 3, 2016

(65) Prior Publication Data
US 2018/0300162 A1    Oct. 18, 2018

Related U.S. Application Data

(60) Provisional application No. 62/152,984, filed on Apr. 27, 2015.

(51) Int. Cl.
*G06F 9/451* (2018.01)
*G06F 17/30* (2006.01)
(Continued)

(52) U.S. Cl.
CPC .............. *G06F 9/453* (2018.02); *G06F 3/167* (2013.01); *G06F 16/64* (2019.01); *G06F 16/957* (2019.01); *G06F 16/986* (2019.01); *G06F 3/0485* (2013.01)

(58) Field of Classification Search
CPC .... G06F 9/453; G06F 17/30896; G06F 3/167; G06F 17/30775
See application file for complete search history.

(56) References Cited

U.S. PATENT DOCUMENTS 6,816,834 B2 * 11/2004 Jaroker .................. G10L 15/26
704/235
7,657,937 B1 * 2/2010 Kumar ................ H04L 63/1416
726/23

(Continued)

FOREIGN PATENT DOCUMENTS

WO    WO 01/57850    8/2001
WO    WO 2016/174585    11/2016

OTHER PUBLICATIONS

International Preliminary Report on Patentability dated Nov. 9, 2017 From the International Bureau of WIPO Re. Application No. PCT/IB2016/052378. (8 Pages).

(Continued)

*Primary Examiner* — Daeho D Song

(57) ABSTRACT

A method of creating content adapted multimedia guidance for a web document, comprising: analyzing location and type of dynamic components in a web document for the creation of a flow dataset, that maps at least one trigger node representing a user initiated trigger event and at least one action node linked to the trigger node and representing instruction to present guidance related to one of the dynamic components in response to the user initiated trigger event; identifying a loading event during which the web document is loaded on a client terminal of a user; extracting at least one generated value from the dynamic components; building an audio sequence associated with the action node by selecting audio segments according to the generated value and arrang- (Continued)

ing the audio segments according to the flow dataset; and when the trigger is activated, playing the audio sequence on the client terminal.

20 Claims, 4 Drawing Sheets

(51) Int. Cl.
*G06F 3/16* (2006.01)
*G06F 16/64* (2019.01)
*G06F 16/958* (2019.01)
*G06F 16/957* (2019.01)
*G06F 3/0485* (2013.01)

(56) References Cited

U.S. PATENT DOCUMENTS

| | | | | |
|---|---|---|---|---|
| 8,185,402 | B2* | 5/2012 | Kurganov | H04M 3/4938 |
| | | | | 704/275 |
| 9,639,507 | B2* | 5/2017 | Murthy | G06F 17/2247 |
| 10,003,690 | B2* | 6/2018 | Bouzid | H04M 3/493 |
| 10,331,754 | B2* | 6/2019 | Borodin | G06F 16/954 |
| 2001/0047262 | A1* | 11/2001 | Kurganov | H04M 3/4938 |
| | | | | 704/270.1 |
| 2001/0054085 | A1* | 12/2001 | Kurganov | G06F 3/167 |
| | | | | 709/218 |
| 2006/0095252 | A1* | 5/2006 | Takagi | G06F 3/16 |
| | | | | 704/200 |
| 2007/0071185 | A1* | 3/2007 | Shibasaki | H04M 3/42161 |
| | | | | 379/88.17 |
| 2009/0228573 | A1* | 9/2009 | Asakawa | G09B 21/006 |
| | | | | 709/218 |
| 2010/0036731 | A1* | 2/2010 | Vieri | G06Q 30/02 |
| | | | | 705/14.53 |
| 2010/0080411 | A1* | 4/2010 | Deliyannis | G06F 16/951 |
| | | | | 382/100 |
| 2013/0166692 | A1* | 6/2013 | Tjin | G06F 16/4387 |
| | | | | 709/219 |
| 2014/0040785 | A1* | 2/2014 | Munday | G06F 9/445 |
| | | | | 715/760 |
| 2014/0337033 | A1* | 11/2014 | Kim | A61H 3/061 |
| | | | | 704/260 |
| 2015/0073805 | A1 | 3/2015 | Stern et al. | |
| 2016/0034260 | A1* | 2/2016 | Ristock | G06F 8/34 |
| | | | | 717/109 |

OTHER PUBLICATIONS

International Search Report and the Written Opinion dated Aug. 22, 2016 From the International Searching Authority Re. Application No. PCT/IB2016/052378.

* cited by examiner

CONTENT ADAPTED MULTIMEDIA GUIDANCE

RELATED APPLICATIONS

This application is a National Phase of PCT Patent Application No. PCT/IB2016/052378 having International filing date of Apr. 27, 2016, which claims the benefit of priority under 35 USC § 119(e) of U.S. Provisional Patent Application No. 62/152,984 filed on Apr. 27, 2015. The contents of the above applications are all incorporated by reference as if fully set forth herein in their entirety.

FIELD AND BACKGROUND OF THE INVENTION

The present invention, in some embodiments thereof, relates to multimedia guidance for websites and, more particularly, but not exclusively, to content adapted multimedia guidance based on a decision graph logic.

Visitors and users of a website may sometimes have some difficulties in understanding the functionality of the website or may be confused by options and information presented to them in the website.

Some solutions to this problem include help pages that may be accessed by the user by pressing a 'Help' link or videos presenting the website's functionality.

SUMMARY OF THE INVENTION

According to an aspect of some embodiments of the present invention there is provided a method of creating content adapted multimedia guidance for a web document, comprising: analyzing at least location and type of a plurality of dynamic components in a web document for the creation of a flow dataset, the flow dataset maps at least one trigger node representing a trigger event and at least one action node linked to the at least one trigger node and representing instruction to present guidance related to one of the plurality of dynamic components in response to the at least one trigger event; identifying a loading event during which the web document is loaded to be rendered by a browser running on a client terminal of a user; extracting at least one generated value from the at least one of the plurality of dynamic components; building an audio sequence by selecting from a plurality of audio segments stored in a database according to the at least one generated value and arranging the audio segments according to the flow dataset, the audio sequence is associated with the at least one action node; and when the trigger is activated, playing the audio sequence on the client terminal.

Optionally, the method further comprises, after the analyzing: automatically creating the flow dataset for the web document based on the analysis.

Optionally, the identifying of the loading is done by receiving an indication of the loading activated by a code line read by a browser rendering the web document.

Optionally, the playing includes buffering the audio segments on a memory of the client terminal and playing the audio segments sequentially.

Optionally, the flow dataset includes at least one root trigger node that initiates the execution of the nodes linked to the root trigger node.

More optionally, when one of the at least one root trigger node is activated, actions linked from another of the at least one root trigger node are stopped.

Optionally, the at least one trigger node is defined to be activated only once for each loading of the web-document.

Optionally, the at least one trigger node includes at least one condition and the trigger is activated only when the condition is fulfilled.

More optionally, the at least one condition includes one of variables extracted from data available on the web document and variables received from the client terminal, wherein the least one condition is fulfilled only for some values of the variables.

Optionally, the at least one trigger node is activated when a specific one of the plurality of audio segments is played.

Optionally, the at least one trigger node is activated by an action made by the user on the web document.

Optionally, the plurality of audio segments includes recorded voices of different languages and the audio sequence is built from audio segments of one of the languages.

More optionally, the one of the languages is determined according to geographic location of the user.

Optionally, at least one of action node of the instruction to present guidance include one of: instruction to present a visual animation element on the web document relating to at least one of the plurality of dynamic components; automatically scroll the web document; instruction to simulate a user's click on the web document; instruction to load a different web document; instruction to present a user-interaction element on the web document; instruction to present a visual effect to indicate a location on the web document; instruction to and activate a document object model (DOM) effect on at least one of the plurality of dynamic components.

More optionally, the presented visual animation element is synced to the played audio sequence movements in the presented visual animation occur simultaneously to specific audio segments of the played audio sequence.

More optionally, the automatic scroll of the web document is initiated when one of the pluralities of dynamic components is not currently visible to the user.

Optionally, the playing includes presenting subtitles of a text corresponding to the audio sequence, the subtitles overlaid on the web document.

Optionally, the playing includes presenting a sound player, the sound player allows the user to control the progress of the audio sequence.

According to some embodiments of the invention there is provided a computer readable medium comprising computer executable instructions adapted to perform the method.

According to an aspect of some embodiments of the present invention there is provided a system creating content adapted multimedia guidance for a web document, comprising: a database for storing a plurality of audio segments; a code store for storing a code; a processor, connected to the interface and the code store, adapted to implement the code; wherein the code comprises: code to analyze at least location and type of a plurality of dynamic components in a web document for the creation of a flow dataset, the flow dataset maps at least one trigger node representing a user initiated trigger event and at least one action node linked to the at least one trigger node and representing instruction to present guidance related to one of the plurality of dynamic components in response to the at least one user initiated trigger event; code to identify a loading event during which the web document is loaded to be rendered by a browser running on a client terminal of a user; code to extract at least one generated value from the at least one of the plurality of dynamic components; code to build an audio sequence by selecting from the plurality of audio segments according to the at least one generated value and arranging the audio segments according to the flow dataset, the audio sequence is associated with the at least one action node, and code to play the audio sequence on the client terminal when the trigger is activated.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
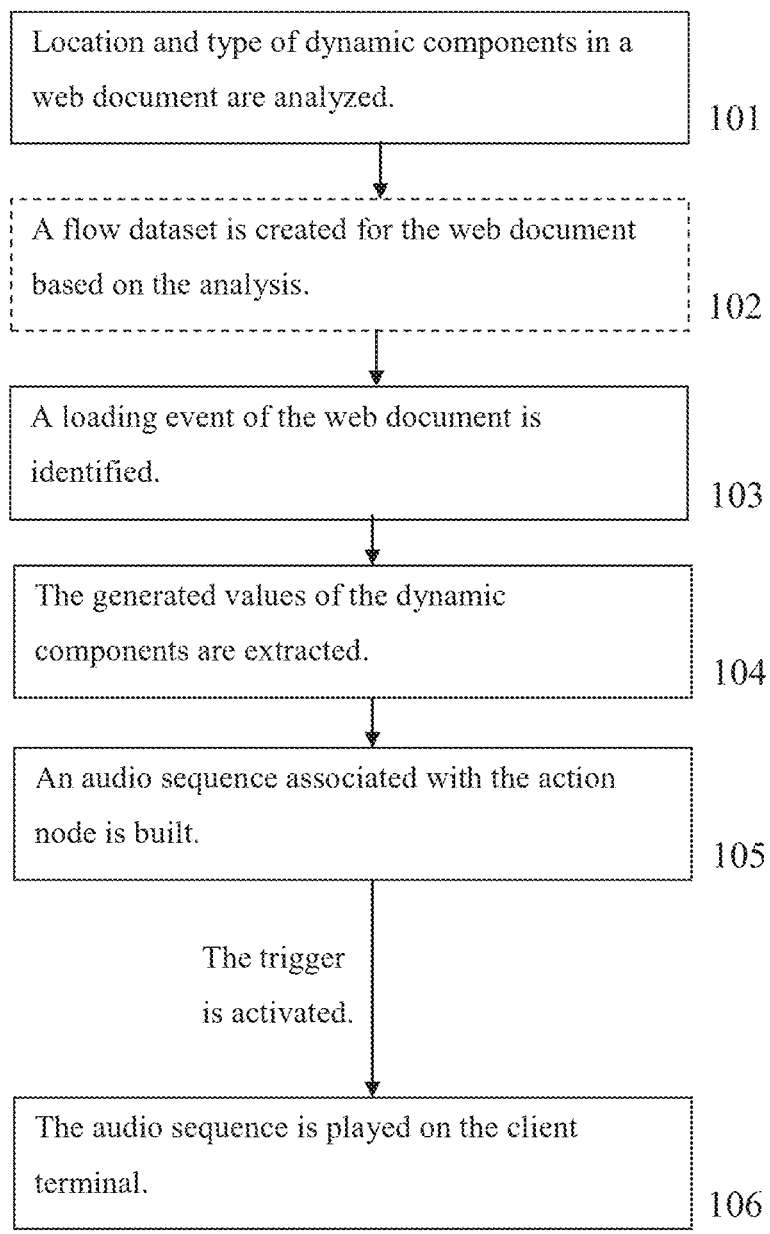
FIG. 1 is a flowchart schematically representing a method for creating content adapted multimedia guidance for a web document, according to some embodiments of the present invention.

The present invention, in some embodiments thereof, relates to multimedia guidance for websites and, more particularly, but not exclusively, to content adapted multimedia guidance based on a decision graph logic.

According to some embodiments of the present invention, there is provided a platform, optionally running one or more servers which are connected to the network, that enables content providers to showcase features of rendered content in websites by presenting a pathfinder to site visitors, for instance a sequence of media objects which are presented to walk a user through the website. Using dynamically customized rich content and natural language, website visitors are intelligently guided by delivered assistance at the right time to the unique content that is presented to them in real time.

The content includes audio sequence that is automatically built from audio segments and is specifically personalized to the site visitor and website parameters.

This generates an increase in a website's usability and, depending on the business objective, may effectively encourage self-service, reduce service costs, increase conversion rates and/or increase engagement with visitors to the website.

The method according to some embodiments of the present invention includes automatic and dynamic generation of an audio sequence that is adapted to the structure of the page and to values which are dynamically added to the page for the specific user who accesses the page. This allows calling the user with his name, reading his quote, showing related animation when needed, selecting a suitable voice, and all in the right logical order that is defined for the web document, either automatically or manually, for example order that is suitable for a quote explanation flow, a dynamic content explanation flow, a pending order and/or a cart explanation flow.

The method is based on an analysis of a web document to map location and type of dynamic components in the web document, such as buttons, links, fields, and/or text. The analysis allows creating a flow dataset, for example a logical decision graph or a state machine for the web document. For example, the flow dataset is a graph wherein each node represents a trigger event such as "mouse-triggers", "dom-triggers" or API triggers, and the link connects these trigger nodes to action nodes which represent instructions to present guidance related to the mapped dynamic components. The instructions may be a link or a pointer to an audio file and/or audiovisual file. When a loading of the web document by a browser running on a client terminal is identified, the values generated in some or all of the dynamic components during the rendering of the webpage are extracted, for example numbers and/or words and/or media objects (e.g. images and/or graphics and/or video files). Now, per action node, an audio sequence is generated. This is done by selecting audio segments from a database of audio segments according to the extracted values and arranging the audio segments in an order determined according to the location and type of the dynamic components, and when the user initiates one trigger, playing the audio sequence on the client terminal.

The action nodes may represent visual and/or functional instructions in addition to creating an audio sequence, for example to present guidance, such as visual animation elements, document object model (DOM) effects, scroll effects, redirect uniform resource locator (URL), text bubble walkthrough, user interaction menu and/or any other guidance action.

The instruction to present guidance represented by action nodes are executed according to the flow dataset and in response to trigger events represented by trigger nodes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
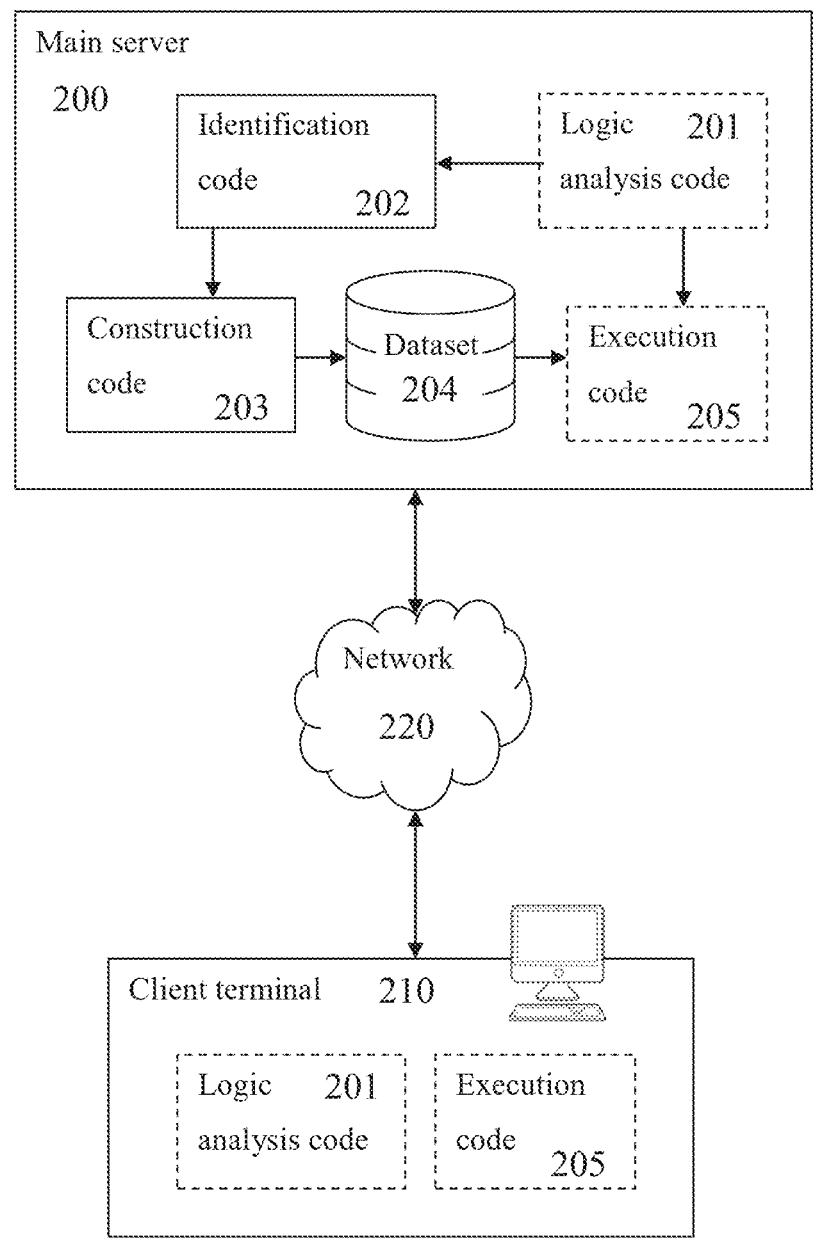
FIG. 2 is a schematic illustration of a system of creating content adapted multimedia guidance for a web document, according to some embodiments of the present invention.

Referring now to the drawings, FIG. 1 is a flowchart schematically representing a method for creating content adapted multimedia guidance for a web document with dynamically customized audio sequence, according to some embodiments of the present invention. Reference is also made to FIG. 2, which is a schematic illustration of a system of creating content adapted multimedia guidance for a web document, according to some embodiments of the present invention.

The system may be executed using storage and processing units of one or more computing devices, such as a mainframe computer, an enterprise server, a workstation, multiple connected computers and/or a personal computer. System The system may include a main server 200 which is connected to client terminal(s) 210 via a network 220, such as the internet or an internal network of an organization.

Client terminal 210 may include, for example, a mobile device such as a Smartphone, a tablet, a wearable device such as Google glass, a Smart watch, a laptop computer and/or the like, a personal computer and/or any device that has one or more network communication modules, such as a network card or chip.

Network 220 may include, for example, local area network (WLAN), a wireless network such as mobile network, wireless local area network (WLAN) such as Wireless Fidelity (WiFi™), a wireless personal area network (WPAN) such as Bluetooth™ protocol and/or any other network.

First, as shown at 101, location and type of dynamic components in a web document are analyzed. This may be done automatically by a logic analysis code 201 that may be processed by a processor of main server 200 or by a processor of client terminal 210, or may be done manually. The dynamic components may be of any type, for example, a button, a link, presented text, a menu, an icon and/or any other element presented on a web document. The location of a dynamic component is the position of the component in the web document, for example, the top of the web document or 300 pixels from the left end of the web document. The location may be defined for example by pixels and/or relative to elements of the web document.

Optionally, other parameters of the dynamic components are also analyzed, for example, size, color, functionality and/or any other parameter.

Optionally, then, as shown at 102, a flow dataset such as a state machine or logical decision graph is automatically created for the web document based on the analysis. This may be done automatically by logic analysis code 201 or manually. The flow dataset may be stored in a memory of main server 200. The flow dataset maps trigger nodes representing a trigger event and action nodes linked to the trigger nodes and representing an action. The action includes instruction to present guidance related to one of the dynamic components in response to the trigger event.

Optionally, the flow dataset is constructed manually by an administrator of the system, based on the results of the analysis presented to the administrator.

A logical decision graph may be a tree based datastructure. The logical decision graph may include several routines. A routine is a path in the logical decision graph that consists of trigger nodes and action nodes and matches the path's conditions.

Optionally, a routine is or may be divided to premade chapters. Each chapter represents a section in the web document or a subject that the routine is referring to. For example, a chapter may be: "Overview"; "Laptops"; "Gadgets"; "Special offers".

The user has the ability to play the chapter, to skip a chapter, to replay a chapter. This feature helps each user to consume only the information that is relevant to him.

Optionally, there may be multiple root entry-points to the logical decision graph that can act in a simultaneous manner. For instance when there are two "root" triggers, one is waiting for the "trigger-button" to be clicked, the second is waiting for a "Take the advanced tour" to be clicked. The user then presses the regular "trigger-button" and a routine is activated. The second "Advanced tour" trigger still awaits for a click event, and once a click event is made by the user, all other currently running routines are aborted and the "Advanced tour" routine starts.

Optionally, each trigger node may be defined either as a one-time trigger or a permanent trigger. When a trigger node is set as a "one-time" trigger, than after the first trigger activation the linked action is not executed again. When a trigger node is set as a permanent trigger, the linked action may be executed again when the trigger node is activated again according to the logical decision graph. Optionally, a trigger node is linked to another trigger node.

A trigger event may be any web event behavior or change. For example, the trigger event may be a user initiated web event such as a mouse exit indicating the user is about to leave the screen, a timer event such as the time since the loading of the web document or since another trigger was activated, an hypertext markup language (HTML) Div/button/input event such as onClick, onChange, onHover, onFocus and/or any other HTML or JavaScript possible event.

A trigger event may also be a trigger-button that triggers a routine. Each trigger-button appended may initiate a different routine on the same web document.

A trigger event may also be a sound trigger, for example when a specific word is played in a sound sequence.

Optionally, a trigger is based on a custom JavaScript that activates the trigger-callback once the trigger condition is validated or the custom trigger's event is triggered.

Optionally, a trigger may include conditions for activation such as complex conditions constructed of variables and including 'and', 'or', 'not', 'contains', 'starts with', etc. the variables may be, for example, DOM/HTML data available on the web document, in the HTML or in the DOM, such as text, input fields, JavaScript contents or divs, server parameters received from the server of the user or the client terminal such as country, state, region, time of day and number of visits to the webpage, website variables such as customers' custom information (login section—username, user "package" or "plan") passed in JavaScript.

An action is the end-result of an activated trigger event. The action may be, for example, a visual action such as enlarge an image/button, a "screen scroll" action, a sound action such as play a sound or a voice-script, popup a div with user-interaction menu or any other effect.

An action node may only point to a trigger node with a condition of the trigger being activated only when the action is finished, or point to another action node.

Figure 3:
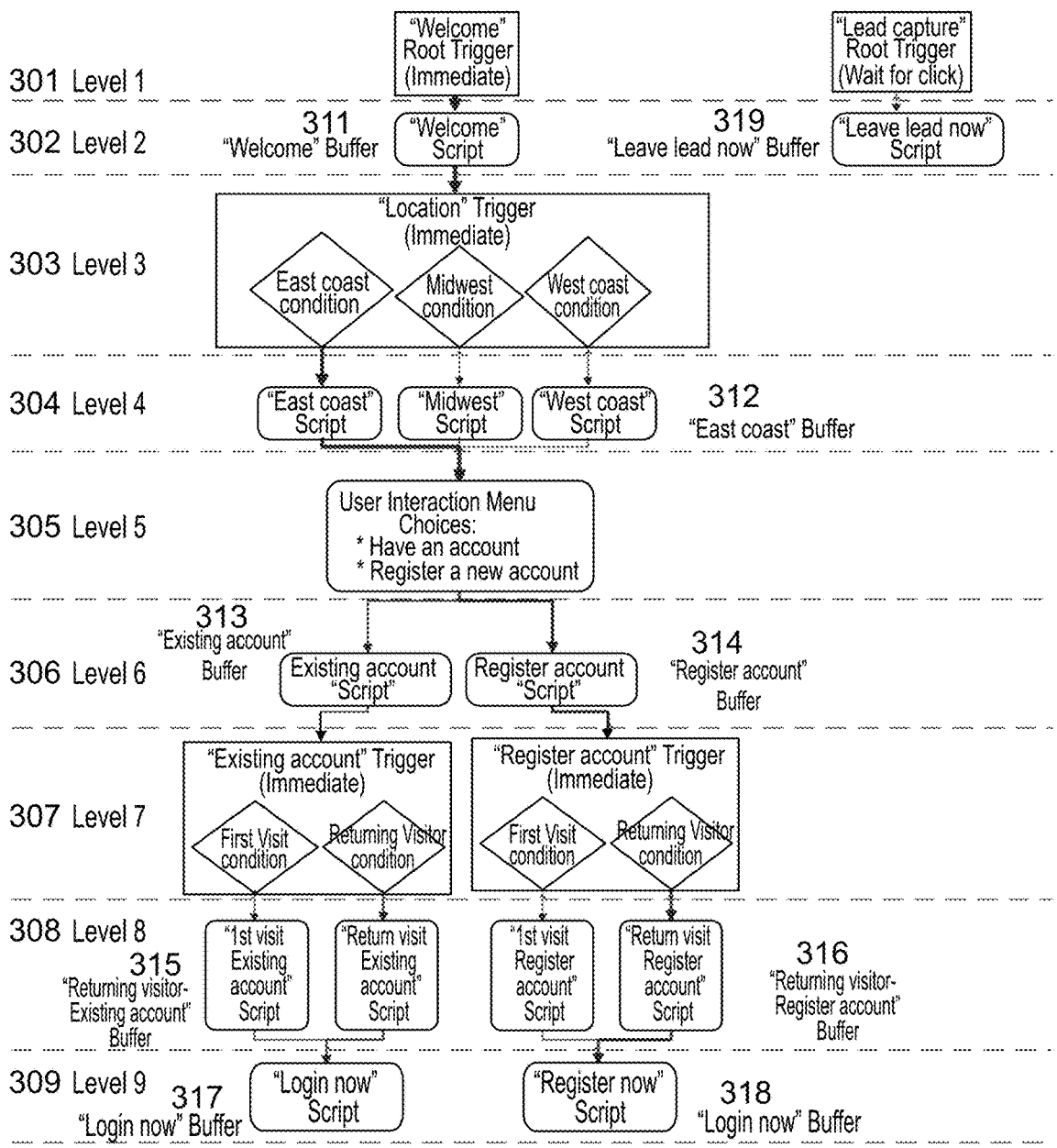
FIG. 3 is an exemplary logical decision graph, according to some embodiments of the present invention.

Optionally, only one branch of the logical decision graph may operate at any time. In this case, when an action is triggered from one graph branch of the logical decision graph, all other running actions on the different graph branches are stopped. Reference is now made to FIG. 3, which is an exemplary logical decision graph, according to some embodiments of the present invention. In this example, trigger nodes are shown as rectangles, action nodes are shown as rounded rectangles and links are shown as arrows. Each level in the graph represents a stage in the process of executing actions following trigger events.

Level 1, as shown at 301, includes two Root triggers (The tree starts from them): (1) Immediate trigger—"Welcome" that is passed-through immediately, (2) Wait for click Trigger—"Lead capture"-> once the lead button is clicked, this trigger is activated.

Level 2, as shown at 302, includes an action—"Welcome script" is activated.

Level 3, as shown at 303, includes an immediate trigger with conditions: (a) When the user is from the "East coast", the "East coast" script is activated, (b) When the user is from the "Midwest", the "Midwest" script is activated, (c) When the user is from the "West coast", the "West coast" script is activated.

Level 4, as shown at 304, includes an action that activates the right location script.

Level 5, as shown at 305, includes an action—User Choice menu that displays a user interaction menu with two options: (a) Have an account, (b) Register an account.

Level 6, as shown at 306, includes two possible actions: (1) When the user chooses he is an existing user, the existing "existing user" script is activated, (2) When the user chooses he is an existing user, the existing "register a new user" script is activated.

Level 7, as shown at 307, includes four options: (1) When the use chooses he is an existing user and this visit is his first visit to this page, the "1st visit Existing account" script is activated. (2) When the user chooses that he is an existing user and this visit is not his first visit to this page, the "Return visit Existing account" script is activated. (3) When the user chooses that he does not have an existing user and this visit is his first visit to this page, the "1st visit Register account" script is activated. (4) When a user chooses that he does not have an existing user and this visit is not his first visit to this page, the "Return visit Register account" script is activated.

Level 8, as shown at 308, includes an action that activates the sound that is chosen on level 7.

Level 9, as shown at 309, includes two actions: (1) When a user chooses he is an existing user, the "login now" script is activated. (2) When the user chooses he is an existing user, the "register now" script is activated.

Referring again to FIG. 1, then, as shown at 103, a loading event of the web document is identified, during which the web document is loaded to be rendered by a browser running on client terminal 210. Optionally, the loading event of the web document is identified by using a code line inserted into the web document by the website operator. The code line sends a notification from client terminal 210 to main server 200. The code line may be included, for example, in the "<head>" section or above the end </body> tag of the web document.

Then, as shown at 104, the generated values of the dynamic components are extracted by identification code 202. The generated values may be, for example, words, numbers such as dates, prices, measurements and/or any other value.

Then, as shown at 105, an audio sequence associated with the action node is built by construction code 203. This is done by selecting audio segments stored in a database 204 according to the generated values and arranging them according to the location and type of the dynamic components. Optionally, the arranging of the audio segments is done according to predetermined guidelines made according to the location and type. For example, an audio segment reading a number is predetermined to follow the word "price" and in accordance with the dynamic component presenting the price in the web document.

The audio segments are parts of speech, such as words or numbers read by a human and recorded on a file. construction code 203 constructs full natural-language sentences out of the audio segments, for example, with the use of the two audio segments "hi" and a dynamic [name] placeholder sound file, the result after a user named "Dan" hears is "Hi Dan, . . . ". In this example, the first name argument is passed to the system as a variable or is available somewhere on the web document.

Optionally, an automatic word-mapping is performed that extracts the millisecond offset value of each word in the sound file, the mapping is done on each sound file. This is done to ensure accuracy when triggering an action at the right word. This may be done by any method, for example by existing sound editing and/or lip-sync tools.

Optionally, the selection of the audio segments includes selecting form different optional languages, voices, pronunciations and/or any other speech parameters. This selection may be based on the location and type of the dynamic components, the generated values and/or any other data. The language may be identified for example according to regional server parameters, and the audio sequence may be played at the language relevant to the location.

Database 204 may be any kind of structured data collection that allows access to stored data. Dataset 204 may be stored, for example, in a digital data storage unit such as a magnetic drive and/or a solid state drive. Database 204 may also be, for example, a content delivery network or content distribution network (CDN) is a large distributed system of servers deployed in multiple data centers across the Internet.

Optionally, construction code 203 is sent to client terminal 210 and is executed by a processor of client terminal 210. Optionally, when the audio sequence is built, the files of the audio segments are automatically sent from database 204 to client terminal 210 via network 220.

The audio segments identified generated values may include words and/or numbers. For example, when an identified generated value of a billing price is $24,462.61, the audio segments that are elected include the words: "Twenty-four", "thousand", "Four", "hundred", "Sixty two" "Dollars", "and", "Sixty-one", "Cents". The number of audio segments that were pre-recorded to support this numbers range and are stored in a database 204 is: the numbers 1-100+the words 'Thousand', 'Hundred', 'Dollars', 'and', 'cents'. The files of the audio segments are then ordered according to the price: 'read_24462.wav'->'read_dollars.wav'->'read_and.wav'→'read_61.wav'->'read_cents.wav'. For another example, when an identified generated value of a date is January 14, the number of audio segments that were pre-recorded to support this numbers range and are stored in a database 204 is: the words "First", "Second", "Third", "Fourth", "Fifth" all the way to 31(Maximum days in the month)+The words 'January', 'February', 'March' and so on.

As shown at 106, when the trigger event is activated, for example by the user, the audio sequence is played on client terminal 210 by execution code 205.

Execution code 205 iterates and activates the instructions that are represented by action nodes in the logical decision graph, validates the conditions of triggers and chooses the right "real-time" action or trigger to run based on the actual moment the condition was queried. Execution code 205 starts running on all the root triggers of the logical decision graph.

Optionally, after a sound sequence is played, the user is asked, for example by voice in the sound sequence, to perform an action such as select an option and/or enter a value. Optionally, the option and/or value entered by the user are then analyzed and used for building another sound sequence as shown at 105 and the sound sequence is played as shown at 106.

The steps shown at 103-106 may be repeated each time the web document is loaded, for example by different users using different client terminals, or by the same user performing different actions on the web document.

Optionally, the audio sequence playing includes presenting subtitles of the text played at the audio sequence. Optionally, a user may switch to "text mode", muting the playing of the audio sequence and only presenting the subtitles.

Optionally, the audio sequence playing includes presenting a sound progress timeline overlaid on the web document. The sound progress is re-calculated in real-time for the audio sequence on each progress-event time interval. The timeline shows the user the exact position in the audio sequence from the total time of this current running audio sequence.

Optionally, the audio sequence playing includes presenting a sound player overlaid on the web document, that lets the user control his guidance experience. The sound player may include functionalities such as Play/Pause, close player, timeline and chapters control. Optionally, the sound player appears when the first audio sequence plays and optionally disappears when the last audio sequence ends on the currently running routine. Optionally, the sound player has both sound and subtitles displaying ability controlling toggling abilities. Optionally, the sound player supports both HTML5 sound player and a fallback of Adobe flash to support old non-HTML5 supporting browsers (or on Safari on windows without QuickTime, using flash). For specific Internet Explorer versions there may be fallback to HTML5 video playing (mp4 format), to extract the sound if no Microsoft media-pack is installed on the client terminal.

In the table below are exemplary functions of the sound player:

| Function | Description | Parameters |
|---|---|---|
| start( ) | Start the decision tree manually. When the tree is already running or finished, this starts over. | |
| stop( ) | Stop the decision tree. All actions are stopped and all triggers are inactivated. Also GUI will be hidden | |
| pause( ) | Pause the tree. The same as pressing on the Pause button on the player. | |
| resume( ) | Resume a paused tree. The same as pressing on the Play button on the player. If the tree is finished or stopped, then the function behaves the same way as start( ) | |
| showPlayer( ) | Show the player. | |
| hidePlayer( ) | Hide the player. | |
| setVar(key, val) | Set a user variable that may be used inside the tree conditions | key-string-the name of the user variable val-string/int/float/bool-the value of the user variable |
| setLanguage (arg) | Set the language. | arg-string-the language (en/fr/he/etc . . . ) |
| registerEvents Callback(func) | Register to a callback function | A function that has the following parameters (look on example): ☐ eventType-string-the name of the event type the happened |
| markPixel(pixel_id) | Set a goal with a specified ID | pixel_id-int-should within the following range: 1-6 |

In the table below are exemplary callback types, some are initiated by the sound player:

| Type | Description |
|---|---|
| GUI_CLOSE | User pressed on the close button on the player OR The player was hidden automatically (at the end of playing all sounds) |
| GUI_PLAY | User pressed on the play button on the player |
| GUI_PAUSE | User pressed on the pause button on the player |
| GUI_VOLUME_CHANGE | User pressed on the volume change button on the player |

-continued

| Type | Description |
| --- | --- |
| GUI_PREVIOUS | User pressed on the previous button on the player |
| GUI_FORWARD | User pressed on the forward button on the player |
| GUI_POWERED_BY_CLICK | User pressed on the powered by button on the player |
| GUI_STARTED | User pressed on the start button trigger. Only if the page has an auto start button trigger. May be followed by a SOUND_STARTED_PLAYING event |
| SOUND_STARTED_PLAYING | A sound started playing. This happens for every played sound |
| TREE_BRANCH_FINISHED | End of the tree branch (all sounds finished playing) |
| FINISHED_INITIALIZING | Decision tree initialization finished successfully |

Optionally, the audio files of the audio segments included in the audio sequence are buffered by execution code 205. Optionally, first are buffered the audio files that are to be played in the audio sequence according to the logical decision graph and are consistent with the currently known conditions of the relevant trigger nodes. When a user-interaction is reached in the logical decision graph, and the conditions are unknown, then audio files to be played according to all condition are buffered execution code 205, level after level.

Reference is again made to FIG. 3, an exemplary buffering sequence for this exemplary logical decision graph is presented.

In Level 1, iterating over all the root triggers and starting from the immediate root triggers.

In Level 2, buffering of the "welcome" script starts first, as shown at 311.

In Level 3, assuming the user is from the east coast (in this example).

In Level 4, buffering of the "East coast" script starts, as shown at 312.

In Level 5, since there is a user interaction menu with two options: (a) Have an account, and (b) Register an account, the algorithm goes to both branches level by level and buffers the validated path by the conditions.

In Level 6, buffering "Existing account", as shown at 313, and once buffering is complete, buffering "Register account", as shown at 314, as they are in the same level of uncertainty.

In Level 7, assuming that this user is a returning user to the website (in this example).

In Level 8, buffering "Return visitor existing account", as shown at 315, and once buffering is complete, buffering "Return visitor register account", as shown at 316, as they are in the same level of uncertainty.

In Level 9, buffering "Login now", as shown at 317 and once buffering is complete, buffering "Register now", as shown at 318, as they are in the same level of uncertainty.

Once the immediate "Welcome" branch finishes buffering, the "Wait" branch starts buffering, as shown at 319.

Optionally, for some mobile devices that require a user-interaction (touch) to start playing audio and/or video elements, pre-loading technique is done to solve this issue, as requesting a user-interaction for each audio file is impractical. The pre-loading technique includes preparing the maximum amount of audio files needed to be played considering the longest branch in the logical decision graph and calling the "sound.load" function on that amount of HTML5 sound-players on the first user-interaction event: jQuery ('*'). on('click touchstart', interactionCallback); Once either the "touchstart" or "click" event happens on the mobile device, the "root" of the event call sets the event's user-interaction security-flag to "true" and allows activation of user-interaction enabled activities like sound/video-playing. Then, calling the "sound.load" event (while the source/src attribute of the player is empty) on every sound-player in the array, thus getting ready-to-use HTML5 sound-players that do not need an additional user-interaction event to start playing. Once the exact audio sequence is built, the source HTML attribute can be set to the "right" sound file, and play. Also, all requests and events that may have happened before the user-interaction event are handled prior to the user-interaction and are stored in a "waiting for user-interaction" memory queue. Once the first user-interaction event received and all the sound-players are "free", all waiting requests and events are handled in the correct order.

Optionally, the "sound.play" function which initiates both sound and buffering in all browsers is called instead of the "sound.load" function. Every mobile device's browser (Native browser, chrome browser on iphone or android etc) behaves differently in terms of events and using the HTML5 Sound player. In order to start buffering after receiving a user-interaction or when trying to initiate buffering in devices that do not require user-interaction, the "sound.load" function is not always enough (even-though it is supposed to be in the documentation).

Optionally, HTML5 Sound players that are only currently buffering are muted (Sets volume to 0) to prevent the user from hearing multiple audio tracks out of his speakers when buffering multiple audio files together, as the sound actually starts playing when calling "sound.play". Once the buffering started the original volume level is set back before to the original value.

Optionally, "sound.canPlay" is used to avoid hearing multiple audio tracks. When playing an audio the position in the audios' timeline is progressing and the track may interfere with the next play (unless using seek). In some browsers the mute function does not work so there is still the "risk" of hearing multiple tracks simultaneously. Calling "sound.pause" function immediately after calling "sound.play" does not solve the problem as in some devices and mobile browsers, when calling both functions one after the other the buffering does not start and both function calls are ignored. To solve this issue, after calling the "sound.play" function "sound.canPlay" event is registered and running with an interval to see if the current position in the timeline is different from zero (meaning the sound started playing).

The "sound.canPlay" does not work in all browsers so the interval fallback exists. Once one of each is true or triggered, the "sound.pause" function is called and the audio file is buffered.

Optionally, the sound source ("sound.src") is also added to initiate the buffering. In some browsers (e.g. Chrome on desktop computer), settings the source attribute is enough to initiate the buffering of the file. The regular "sound.load" is also called, which is enough in some browsers (e.g. Chrome on tablet).

Optionally, sound gap concealment test is used to ensure that the multiple audio segments are played as a "seamless" sequence as if they were one "whole" audio track.

In some browsers (such as Android Chrome), when playing one audio track immediately after a previous audio track, there is a delay even when both audio files are fully buffered on the device. The time elapsed between the two tracks varies between each two devices and sometimes even between plays on the same device. To solve this issue, two different "empty" audio files are loaded when buffering starts.

The files are low weight so as not to interfere with the main buffering of audio files. The reason that two different audio files are used is that in some browsers the delay does not occur when playing the same file in two adjacent HTML5 sound-players. Then, the average delay time between these two almost-empty sound files is calculated, for example upon 10 plays, depending on the buffering phase. The calculation is made at a specific time between the buffering of the most prioritized audio files, since the gap concealment test stops the buffering process of other audio files on most browsers. Once the average delay time is known, execution code 205 starts each audio segment playing earlier by the "average delay time". This way the audio files may be played as if the device does not have the sound gaps problem.

Optionally, other visual and/or functional actions are activated by execution code 205, such as presenting graphic elements. Optionally, an action includes an automatic scroll action, for example to a position on the page and/or to an element on the page (with an optional offset). Optionally, an action includes a simulation of a user's click on an HTML element that exists on the webpage, such as menus, buttons, divs, etc. Optionally, an action includes a redirect of the browser to a different web document or URL. Optionally, an action includes a user-interaction element such as a pop-up menu or any form of display (div etc), on a web document. The purpose of this user-interaction menu is to get an input from the user and act according to the triggers that are defined inside the logical decision graph. Optionally, an action includes custom html elements JavaScript action on the web document, for example a custom div element or an imported image. Optionally, an action includes a popup div with an iframe in order to display content from a different location in the website. This enables a website to display parts of their knowledge base in web documents to reduce support costs.

Optionally, an action includes a visual animation element as an overlay to the web document, such as graphics interchange format (GIF), portable network graphics (PNG) animated PNG (APNG) or scalable vector graphics (SVG). The animation may include, for example, circling, arrows, marker of a text, bordering, underlining a specific word in a text and/or any other effect. Optionally, the visual animation element includes character animation. The animated character may be 2-dimensional or 3-dimensional and may point and direct to element on the website. The animated character may be matching the played audio sequence and include lip-sync. The animated character may be configurable and has features such as containing a 'on top of the character' player or a possibility to have a logo of a brand on the character's shirt.

Optionally, when a visual action like DOM effect or a visual graphic on an HTML element is performed, and the HTML element is not in the current visible area in the browser, a scrolling action is activated before the visual is shown. In order to perform this feature an "auto-scroll" to the next playable visual action is activated while taking into consideration the speed needed to scroll to the element. For example, when there is a script that is made of two sentences: "Choose between our laptops: the standard, the touch or the all-in-one", the web document is scrolled slowly on the first sentence and in the rest of the sentence the web document is scrolled fast to each kind of laptop because the words are consecutive adjacent in the text. In this example, an action algorithm may be: "Choose {slow scroll to laptops area starts} between our {slow scroll to laptops area ends} laptops: the {fast scroll to standard laptops area} standard, {very-fast scroll to touch laptops area} touch or {fast scroll to all-in-one laptops area starts} the {fast scroll to all-in-one laptops area ends} all-in-one".

Optionally, an action includes an image pre-loader module. The image pre-loader is responsible for playing GIF or SVG animations, positioning them, hiding them and caching them. The images are stored on dataset 204. There are two major issues in using GIF or SVG images in a "real-time" environment that requires the image files to be played exactly on the right moment of a sound trigger. First, when the download of the image files is initiated only at the moment of the sound trigger, the presentation itself wouldn't be precise and there would be delays in the presentation which would result a non-perfect user-experience. Second, For GIF files, when the same URL of a GIF is re-used twice, the last downloaded version of the GIF file is pulled from the browser's cache and would play only the last frame instead of the whole GIF. To solve these issues the GIF pre-loader module uses a buffering mechanism that buffers all the GIFs needed in the current validated logical decision graph path in Base642 format (Base64 is a group of similar binary-to-text encoding schemes that represent binary data in an ASCII string format by translating the data into a radix-64 representation.). Then, in order to use the same GIF over and over again (when the user replays the routine or when there are more than one identical visual actions using the same GIF file), the image pre-loader module changes the last two bytes in the base64 image file so the file is a slightly different in the last pixel drawn, and at the right timing the HTML image's src property (data:image/png;base64.) may be placed to the altered already pre-cached base64 file, thus giving a perfectly timed user-experience to the end user without unnecessary network delay influences. In browsers that do not support base64 as input to the HTML image's src attribute (such as Internet Explorer 7) the system downloads the image file when the sound trigger is activated and uses a random query string to the file URL to avoid browser's cache reuse of the same file.

Optionally, an action includes a DOM effect (CSS+ JavaScript effects on the element) to highlight existing elements on the webpage, for example, enlarge, shake, tilt, shrink, color highlight, adding a "flying" text to the screen, etc.

Optionally, when the browser of client terminal 210 supports the CSS3 "transition" & "transform" properties, then the system uses these properties to show the DOM effects that requires these properties in order to achieve a smoother UX result. Optionally, for browsers that do not support the CSS3 "transition" & "transform" properties, the system uses an interval that changes the style on every step. For example, on Internet Explorer 7, 8, and 9, Firefox (Version<3.4), Opera (Version<11.7), Safari (Version<5) there is no "transform" (scale, rotate, translate, skew), so the system uses CSS filters (such as 'ms-filter', 'moz', 'webkit', 'o' etc). Each browser may have different properties depending on the specific render engine (for instance safari with webkit).

Optionally, the DOM effect includes support for changing style in a DOM element that one of his parents has "overflow: hidden" or "overflow:scroll". When using an effect that changes the element like "enlarging" or using "shake & tilt" for instance, and the element makes one of the parent div in the HTML hierarchy to overflow and that parent has a CSS attribute of "overflow:hidden" or "overflow:scroll", A scroll appears in that inner element of the page causing a bad user experience. This problem is solved by: copying the "touched" element, positioning the element with "position: absolute" to the same exact location, hiding the original element, making the transformation (for example enlarge and return to the original style and condition), showing the original element and hiding the added element.

Optionally, an action includes a text bubble walkthrough. The text bubble walkthrough may be an alternative or an addition to the audio sequence. The text bubbles may contain, for example, Title & Content text, "Previous" and "Next" buttons to control the current step in the guidance, "Step 2 out of 6" text so that the user may be aware of his walkthrough progress and/or a custom HTML div, external image or an iframe as part of the tutorial. The text bubbles may also contain an option buttons that includes few options that the user may choose between, for example: "Choose between our:" (1) PCs, (2) Laptops or (3) Tablets. Each one of these options may trigger for example a new graph branch or a chapter.

Optionally, an action includes an option to guide the user to a specific location on the web document to point the user to the right section of the screen and have him always focusing on the relevant content when running the routine. This is made to cause the user to better understand the presented data. Optionally, this is done by a hand cursor image that moves from one displayed action (Visual animation, Dom Effect) to another displayed action. The user's eye focus automatically goes to the hand cursor and the cursor guides him throughout the routine. Optionally, this is done by a "Stage spotlight effect" on a webpage, by using blur and/or opacity on the elements that are not in the main focal point of the current action. The focus area moves from one displayed action (Visual animation, Dom Effect) to another displayed action.

Figure 4:
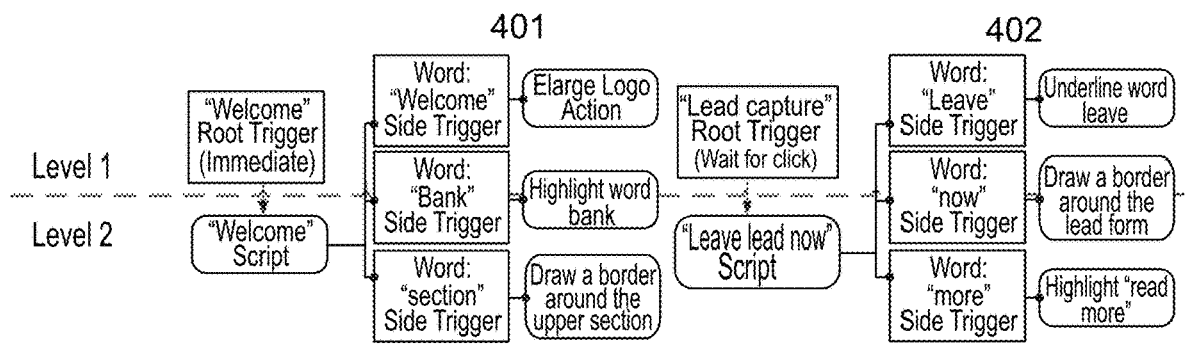
FIG. 4 is a detailed part of the exemplary logical decision graph of FIG. 3, including sound triggers, according to some embodiments of the present invention.

Reference is now made to FIG. 4, which is a detailed part of the exemplary logical decision graph of FIG. 3, including sound triggers, according to some embodiments of the present invention.

When the "Welcome" script is activated by the "Welcome" trigger, an audio sequence is played. As shown at 401, when the audio segment of the word "welcome" is played, a sound trigger is activated and the "Enlarge" action on the logo of the company is activated. Similarly, when the audio segment of the word "bank" is played the "highlight" action on the word 'bank' on the webpage is activated; and when the audio segment of the word "section" is played a border around the upper section of the page is drawn.

When the "Lead capture" root trigger is activated by a user's click, the "Welcome" script is stopped and the "Leave lead now" script is activated and another audio sequence is played. As shown at 401, when the audio segment of the word "leave" is played the "Underline" action on the word "leave" on the webpage is activated; when the audio segment of the word "now" is played a border around the lead form section of the page is drawn; and when the audio segment of the word "more" is played the "highlight" action on the 'read more' link on the webpage is activated.

Figure 5:
FIG. 5 is a screenshot of a web document overlaid with content adapted graphic elements for guidance, according to some embodiments of the present invention.

Reference is now made to FIG. 5, which is a screenshot of a web document overlaid with content adapted graphic elements for guidance, according to some embodiments of the present invention. A sound player 501 is presented to the user, allowing him to control the played audio guidance. Underline 502 and circle 503 are directing the user's vision to the relevant dynamic components, the product name and price, according to the played audio sequence.

Optionally, the system includes a storage that stores code for real-time personalization rules that may be constructed from each one of the conditions types mentioned above. For example, whilst one user who is a "Gold-member" and surfing from the US is presented with the gold member routine in English, a different user who is a "Platinum-member" and surfing from Japan receives a Japanese version of the platinum-members routine.

Optionally, the system includes a storage that stores code for post data analytics. Events that happen on client terminal 210 are sent to the system and registered in a dataset or log files. Events may include, for example, a routine starts playing or finished playing, a user presses the pause button, a user clicked a goal button, and/or any other event that is relevant to track.

Optionally, the method may also be used to present content adapted multimedia guidance on top of an application such as an application of a mobile device. Optionally, the audio sequence and/or audiovisual elements is adapted to a set of sequential screens which are presented to a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant content adapted multimedia guidance for websites will be developed and the scope of the term multimedia guidance is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating content adapted multimedia guidance for a web document, comprising:

automatically creating a flow dataset of a web document by analyzing at least location and type of a plurality of dynamic components in said web document, said flow dataset maps at least one trigger node representing at least one user initiated trigger event and at least one action node which is linked to said at least one trigger node and representing instruction to present audio guidance related to at least one of said plurality of dynamic components in response to said at least one user initiated trigger event;

identifying a loading event during which said web document is loaded to be rendered by a browser running on a client terminal of a user;

extracting at least one value generated in said at least one dynamic components during said rendering of said web document;

automatically building an audio sequence comprising audio segments selected from a plurality of audio segments stored in a database according to said at least one generated value and arranging said audio segments of said audio sequence according to said location and type of said plurality of dynamic components, said audio sequence is associated with said at least one action node; and playing said audio sequence on said client terminal by said browser to present said audio guidance to assist said user when said at least one user initiated trigger event linked to said at least one action node is activated.

2. The method of claim 1, wherein said identifying of said loading is done by receiving an indication of said loading activated by a code line read by a browser rendering said web document.

3. The method of claim 1, wherein said playing includes buffering said audio segments on a memory of said client terminal and playing said audio segments sequentially.

4. The method of claim 1, wherein said flow dataset includes at least one root trigger node that initiates execution of at least one nodes linked to said at least one root trigger node.

5. The method of claim 4, wherein when one of said at least one root trigger node is activated, actions linked from another of said at least one root trigger node are stopped.

6. The method of claim 1, wherein said at least one trigger node is defined to be activated only once for each loading of said web-document.

7. The method of claim 1, wherein said at least one trigger node includes at least one condition and said trigger is activated only when said condition is fulfilled.

8. The method of claim 7, wherein said at least one condition includes one of variables extracted from data available on said web document and variables received from said client terminal, wherein said least one condition is fulfilled only for some values of said variables.

9. The method of claim 1, wherein said at least one trigger node is activated when a specific one of said plurality of audio segments is played.

10. The method of claim 1, wherein said at least one trigger node is activated by an action made by said user on said web document.

11. The method of claim 1, wherein said plurality of audio segments includes recorded voices of different languages and said audio sequence is built from audio segments of one of said languages.

12. The method of claim 11, wherein said one of said languages is determined according to geographic location of said user.

13. The method of claim 1, wherein at least one of action node of said instruction to present guidance include one of: instruction to present a visual animation element on said web document relating to at least one of said plurality of dynamic components; automatically scroll said web document; instruction to simulate a user's click on said web document; instruction to load a different web document; instruction to present a user-interaction element on said web document; instruction to present a visual effect to indicate a location on said web document; instruction to and activate a document object model (DOM) effect on at least one of said plurality of dynamic components.

14. The method of claim 13, wherein said presented visual animation element is synced to said played audio sequence such that movements in said presented visual animation occur simultaneously to specific audio segments of said played audio sequence.

15. The method of claim 13, wherein said automatic scroll of said web document is initiated when one of said plurality of dynamic components is not currently visible to the user.

16. The method of claim 1, wherein said playing includes presenting subtitles of a text corresponding to said audio sequence, said subtitles overlaid on said web document.

17. The method of claim 1, wherein said playing includes presenting a sound player, said sound player allows said user to control progress of said audio sequence.

18. The method of claim 1, wherein said audio sequence includes instructions for said user to perform an action on said web document.

19. A computer program product for creating content adapted multimedia guidance for a web document, comprising:
a non-transitory computer readable storage medium;
first program instructions to automatically create a flow dataset of a web document by analyzing at least location and type of a plurality of dynamic components in said web document, said flow dataset maps at least one trigger node representing at least one user initiated trigger event and at least one action node which is linked to said at least one trigger node and representing instruction to present audio guidance related to at least one of said plurality of dynamic components in response to said at least one user initiated trigger event;
second program instructions to identify a loading event during which said web document is loaded to be rendered by a browser running on a client terminal of a user;
third program instructions to extract at least one value generated in said at least one dynamic component during said rendering of said web document;
fourth program instructions to automatically build an audio sequence comprising audio segments selected from a plurality of audio segments stored in a database according to said at least one generated value and arranging said audio segments of said audio sequence according to said location and type of said plurality of dynamic components, said audio sequence is associated with said at least one action node; and
fifth program instructions to play said audio sequence on said client terminal by said browser to present said audio guidance to assist said user when said at least one user initiated trigger event linked to said at least one action node is activated;
wherein said first, second, third, fourth and fifth program instructions are executed by at least one processor from said non-transitory computer readable storage medium.

20. A system creating content adapted multimedia guidance for a web document, comprising:
a database for storing a plurality of audio segments;
a code store for storing a code;
a processor, connected to said database and said code store, adapted to implement said code;
wherein said code comprises:
code to automatically create a flow dataset of a web document by analyzing at least location and type of a plurality of dynamic components in said web document, said flow dataset maps at least one trigger node representing at least one user initiated trigger event and at least one action node which is linked to said at least one trigger node and representing instruction to present audio guidance related to at least one of said plurality of dynamic components in response to said at least one user initiated trigger event;
code to identify a loading event during which said web document is loaded to be rendered by a browser running on a client terminal of a user;
code to extract at least one value generated in said at least one dynamic components during said rendering of said web document;
code to automatically build an audio sequence comprising audio segments selected from said plurality of audio segments according to said at least one generated value and arranging said audio segments of said audio sequence according to said location and type of said plurality of dynamic components, said audio sequence is associated with said at least one action node; and
code to play said audio sequence on said client terminal by said browser to present said audio guidance to assist said user when said at least one user initiated trigger event linked to said at least one action node is activated.

* * * * *